United States Patent Office 3,335,195
Patented Aug. 8, 1967

3,335,195
PREPARATION OF HALO CYCLOBUTENE
COMPOUNDS
Harold H. Freedman, Brookline, Mass., assignor to The
Dow Chemical Company, Midland, Mich., a corporation of Delaware
No Drawing. Filed Feb. 13, 1962, Ser. No. 172,848
1 Claim. (Cl. 260—649)

This invention relates to a method for preparation of halogenated cyclobutene derivatives and more particularly to 3,4-dihalotetraphenylcyclobutene, wherein metal complexes of cyclobutadiene are reacted with an appropriate halogenating agent.

Compounds structurally carrying very active halogen atoms find a wide variety of uses where it is desirable to introduce other functional groups into the molecule or the utilization of the active sites for synthesis of the cyclobutene moiety. They are also useful as catalytic agents, especially in liquid phase, and in combustion processes as fuel additives.

It is a fundamental object of this invention to provide a method for the preparation of halocyclobutene compounds having a reactive small ring system, wherein the method of preparation is characterized by formation of these compounds from certain starting metal complexes of cyclobutadiene derivatives.

Other objects and advantages of the invention will in part be obvious and in part appear hereinafter.

The invention, accordingly, is embodied in the preparation of halocyclobutene compounds, wherein a metal complex of cyclobutadiene derivative is reacted with an appropriate halogenating agent to yield a cyclobutene compound carrying active halogen atoms.

The method of preparation involves dissolving the starting metal complex of cyclobutadiene in an appropriate solvent, adding thereto an appropriate halogenating agent in excess beyond a 1:1 molar ratio, maintaining the temperature of the solution close to ambient temperature, allowing the reaction to proceed slowly to the formation of the cyclobutene compound carrying active halogen atoms.

Typical starting cyclobutadiene derivatives and metal complexes thereof are:

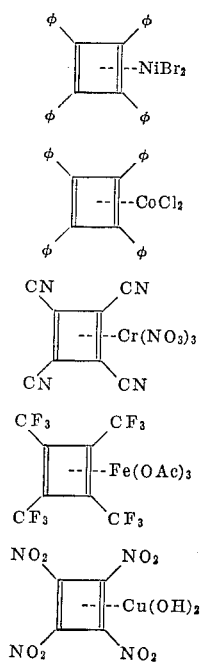

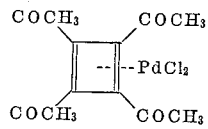

and are prepared by reacting a halobutadienylalkyl metal halide with an appropriate transition metal compound. Other complexes of transition metal bodies may be used as starting materials. Their method of preparation is shown in my copending application Ser. No. 71,898, filed Nov. 28, 1960, now Patent No. 3,130,216.

The following example will illustrate the method by which the starting compound can be prepared:

*Example I.—Preparation of the starting compound—nickel bromide complex of tetraphenylcyclobutadiene*

In a suitable vessel equipped with a stirrer and a nitrogen inlet is placed 6.65 grams (0.01 mol.) of (4-bromo-cis,cis-butadienyl)-dimethyltin-bromide (melting point 142–3° C.) dissolved in 75 milliliters of dry dimethoxy-triethyleneglycol (Ansul 161), along with 2.51 grams (0.0115 mol.) of anhydrous nickel bromide. The stirrer is started, nitrogen is introduced, and the reaction mixture heated over a 15-minute period to 145±5° C. When the temperature reaches ~125° C., the mixture turns a deep blue and after approximately 30 minutes at 145° C., most of the yellow-brown nickel bromide disappears and is replaced with a blue-black solid. Stirring and heating is maintained for a total of 90 minutes, and the reaction mixture is then cooled and filtered. The solid which weighs approximately 5 grams is washed repeatedly with benzene and then extracted continuously in a Sohxlett apparatus with 200 milliliters of methylene chloride. When all the complex has been extracted, the blue-green methylene chloride solution is evaporated to yield 4 grams (70%) of blue-black small crystals which on recrystallization from bromobenzene or from other halogenated aliphatic or aromatic solvents analyzes for $C_{28}H_{20} \cdot NiBr_2$ (Found: C, 58.4; H, 3.6, Br, 27.9; NiO, 12.5).

In the preparation of the halocyclobutene compounds of this invention it is most desirable that the halogenating agent be added to the metal complex-solvent suspension so that an excess of halogenating agent beyond a 1:1 molar ratio of halogenating agent to metal complex is employed. The temperature at which the reaction is carried out is not critical but it is preferable to maintain the temperature at approximately ambient levels. A temperature range from 0° C. to solvent reflux is acceptable. In general solvents which dissolve the metal complex without reacting with the brominating agent are indicated. Typical solvents are methylene chloride or chloroform. Since the reaction is self-sustaining to completion, time is only a factor in that the reaction proceeds slowly to completion and can range from 1–24 hours. Pressure is not a critical feature and atmospheric pressure is sufficient.

For a better and more detailed understanding of the invention and the technique by which the compounds can be prepared, the following examples are illustrative:

*Example II.—Preparation of 3,4-dibromotetraphenyl cyclobutene*

To a partially dissolved suspension of 5.75 g. (0.1 millimole) of the nickel bromide complex of tetraphenylcyclobutadiene in 250 ml. of methylene chloride is added 6.4 g. (100% excess) of pyridinium hydrobromide perbromide ($C_5H_5N \cdot HBr \cdot Br_2$) and the mixture stirred at room temperature in a round bottom flask protected by a drying tube. The reaction proceeds slowly, hydrogen bromide is evolved, and the deep blue-green color of the reaction mixture is eventually discharged over a 3–12 hour period. The resulting clear yellow solution contains a brown amorphous solid which is evidently a complex of pyridine and nickel bromide. The methylene chloride reaction mixture is filtered and the solvent removed under vacuum. The residual solid is transferred to a funnel and washed with cold ethanol to remove unreacted pyridinium hydrobromide perbromide, the washing being continued until the solid on the filter is white in color. One final washing with cold ether yields substantial pure 3,4-dibromotetraphenylcyclobutene of M.P. ~170°. Recrystallization from acetone gives analytically pure material of M.P. 176–7°. The yield of pure material is approximately 50–60%.

The reaction is illustrated as follows:

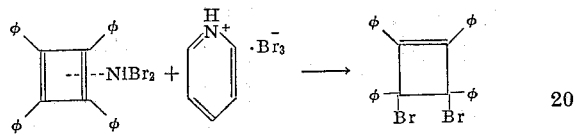

What is claimed is:

The method of preparing dibromotetraphenylcyclobutene which comprises reacting a nickel bromide complex of tetraphenylcyclobutadiene with an excess of pyridinium hydrobromide perbromide in the presence of an inert solvent and thereafter recovering the dibromotetraphenylcyclobutene.

References Cited

Freedman, J.A.C.S., 83, 2194–S (1961).
Jensen et al., J.A.C.S., 82, 148–51 (1961).
Merker et al., J. Chem. Education, 26, 613–14 (1949).

LEON ZITVER, *Primary Examiner.*

K. H. JOHNSON, J. W. WILLIAMS,
*Assistant Examiners.*